United States Patent
Bohner et al.

[11] Patent Number: 5,797,294
[45] Date of Patent: Aug. 25, 1998

[54] SHIFT VALVE

[75] Inventors: Ulrich Bohner, Uhldingen-Mühlhofen; Winfried Fideler, Friedrichshafen, both of Germany

[73] Assignee: ZF Friedrichshafen AG, Friedrichshafen, Germany

[21] Appl. No.: 750,680

[22] PCT Filed: Jun. 12, 1995

[86] PCT No.: PCT/EP95/02265

§ 371 Date: Dec. 12, 1996

§ 102(e) Date: Dec. 12, 1996

[87] PCT Pub. No.: WO95/34774

PCT Pub. Date: Dec. 21, 1995

[30] Foreign Application Priority Data

Jun. 16, 1994 [DE] Germany ............ 44 21 115.5

[51] Int. Cl.[6] .................................................. F16H 59/00
[52] U.S. Cl. ........................................... 74/335; 477/906
[58] Field of Search ................. 74/335, 360; 477/127, 477/130, 906, 141, 156; 137/625.66, 624.27, 625.63, 625.64, 625.48

[56] References Cited

U.S. PATENT DOCUMENTS 3,199,647  8/1965  Staab ............................ 192/87
3,772,933  11/1973  Prenzel et al. .................. 74/335
4,041,983  8/1977  Bianchetta ................... 137/625.63
4,046,165  9/1977  Rose, Sr. et al. ............. 137/624.27

FOREIGN PATENT DOCUMENTS 0 309 070  3/1989  European Pat. Off. .
1 960 742  6/1970  Germany .

*Primary Examiner*—Charles A. Marmor
*Assistant Examiner*—Marcus Charles
*Attorney, Agent, or Firm*—Davis and Bujold

[57] ABSTRACT

A shift valve is proposed for switching the direction of travel of a powershift transmission and, in particular, a tractor, wherein a slide valve (20) fitted in a valve housing (1) can slide into a forward, a reverse or a neutral position. The slide valve (2) can be displaced by electro-hydraulic devices. Centering pistons (21, 22 and 210, 220) are provided in the valve housing (1) which, during normal operation, lie in a withdrawn or non-activated position, but during emergency operation can be hydraulically or pneumatically activated in such a way that they actuate the slide valve (20) while bypassing normal control of the latter.

12 Claims, 3 Drawing Sheets excess pressure supplied to a lubrication line 9 for lubricating the transmission. A pressure line leads from the system pressure valve 8 to a pressure control valve 10. The pressure control valve 10 has the known task of producing a modulated pressure increase for actuations of the clutches. From the pressure control valve 10, a pressure line leads to retaining valves 11, not shown in detail, by means of which the clutches to be disconnected can still be briefly held. A shift valve 14 serves to select the clutches 3 to 6. A shift valve 15 is provided for the clutches 12 and 13.

SHIFT VALVE

BACKGROUND OF THE INVENTION

A transmission control of a powershift transmission of this kind has, in general, two forward clutches and two reverse clutches. The corresponding clutch is controlled by a reversing slide or a slide valve having a forward, a reverse and a neutral position. The operation of the slide valve by mechanical devices is already known. Therefore, rotary fingers are provided, for example, by which the slide valve is moved linearly. The rotary finger can be activated by the driver via a Bowden cable.

One disadvantage of the known mechanical solutions, however, is that they are relatively costly to actuate and that, in general, there is no other possibility of affecting or engaging the displacement of the slide valve.

Therefore, the problem on which this invention is based is to provide a shift valve of the kind mentioned above which is easier to actuate and in which, in addition to the normal kind of actuation of the main function, other kinds of actuation are possible when required.

The slide valve is now electro-hydraulically displaced according to the invention. The Bowden cable known for actuating the slide valve is not needed. The initiation or actuation is instead effected electrically such as by magnetic valves. The magnetic valves act, for example, when operating pressure lines, in the sense of raising the pressure by which the desired reversal or linear displacement of the slide valve is obtained.

This manner of actuation can be designated as a basic function. Very few parts are needed for this. In particular, mechanical communication with the driver is no longer required, since the magnetic valves can be easily activated by an electric control connection.

According to the invention, in addition to the above mentioned basic function, a second actuation system can be activated, for example, for emergency operation. In case of failure or interruption of the electro-hydraulic actuation, this system comes into force, according to the invention, in a manner such that if the normal control fails, the slide valve concerned can be correspondingly actuated by the centering piston. This means that it is possible, during an emergency situation, to bring the slide valves to a desired position. In this manner it can be prevented that in case of failure of the normal control, the vehicle, such as a tractor in which the transmission according to the invention has been installed, is no longer movable. If, for example, a displacement in the forward position is effected by an emergency actuation of the slide valve by the centering pistons, the vehicle can be adequately moved. By said emergency actuation, it is possible to continue the work of the tractor or to drive the tractor by its own force back to a yard or to a workshop. It is likewise possible to bring the slide valve to a neutral position by shutting off the engine. Thereby, it is possible, in the case of failure of the electro-hydraulic actuation, to preserve the blocked position of the valve. When the motor is restarted the transmission is assuredly in neutral.

BRIEF DESCRIPTION OF THE DRAWINGS

Advantageous developments and designs of the invention can be seen from the embodiments described herebelow in principle with the aid of the drawings. In the drawings.

DESCRIPTION OF PREFERRED EMBODIMENTS

Figure 1:
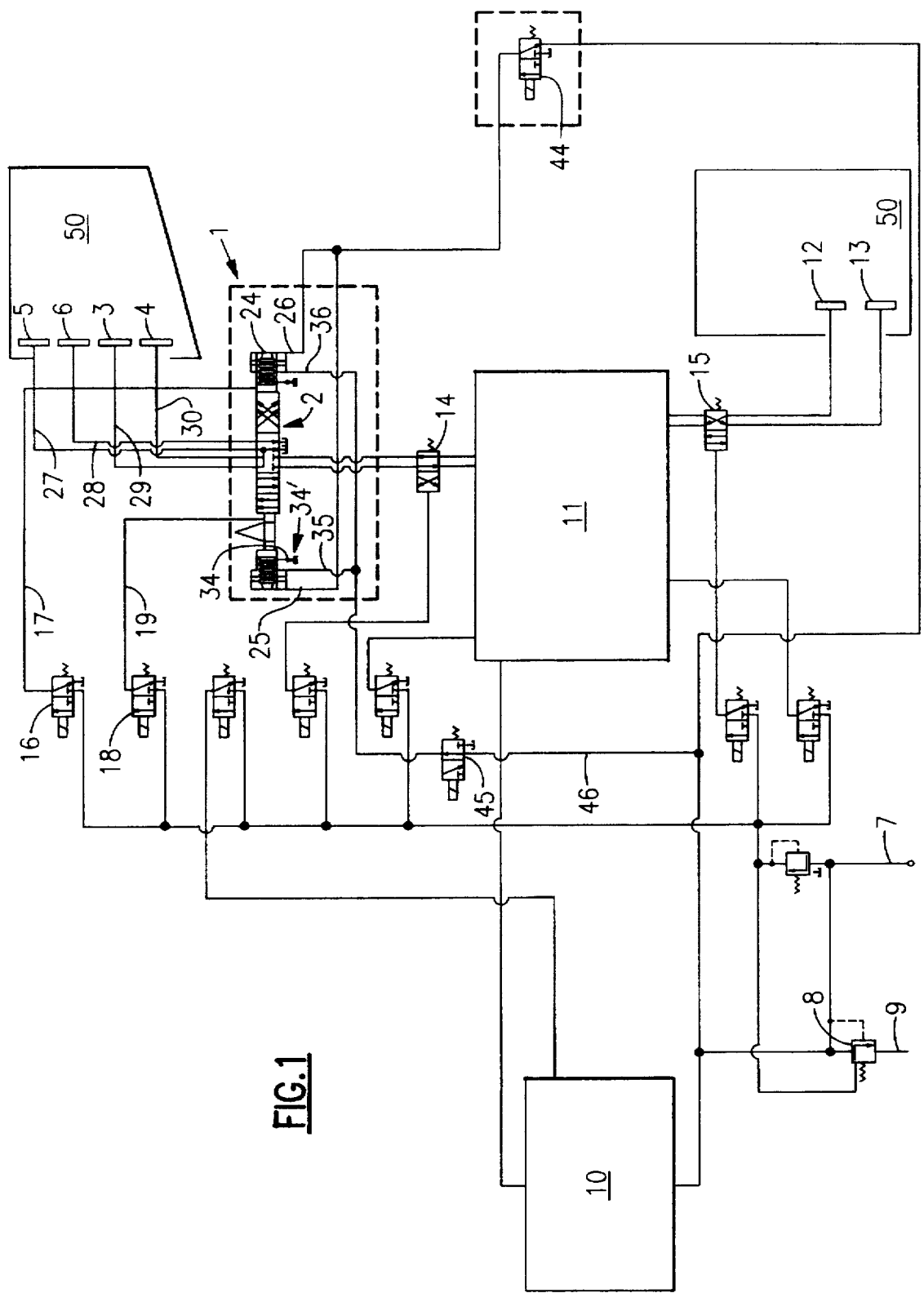
FIG. 1 is a flow diagram of one embodiment.

In FIG. 1 only a simplified flow diagram is shown, since its design is basically known. Only the parts essential to the invention are described in detail there. In the structural embodiments shown in FIGS. 2/3 and 4/5, the same numerals are used for the same parts.

A shift valve 2 is situated in a valve housing 1, which has three shifting positions adjustable by a slide valve which is also designated as reversing slide, namely, a shift position for forward travel, a neutral position and a shift position for reverse travel.

The shift valve 2 engages two forward clutches 3, 4 and two reverse clutches 5, 6. Pressure is supplied to a system pressure valve 8 from pressure line 7. The system pressure valve 8, in a manner known per se, limits the pressure for the powershift transmission shown schematically at 50 to 18 bar, for example. The excess amount of pressure is supplied to a lubrication line 9 for lubricating the transmission. A pressure line leads from the system pressure valve 8 to a pressure control valve 10. The pressure control valve 10 has the known task of producing a modulated pressure increase for actuations of the clutches. From the pressure control valve 10, a pressure line leads to retaining valves 11, not shown in detail, by means of which the clutches to be disconnected can still be briefly held. A shift valve 14 serves to select the clutches 3 to 6. A shift valve 15 is provided for the clutches 12 and 13.

A magnetic valve 16, for reverse travel, is connected with a pressure line 17 leading to the shift valve and a magnetic valve 18, for forward travel, is connected with a pressure line 19 likewise leading to the shift valve 2.

Figure 2:
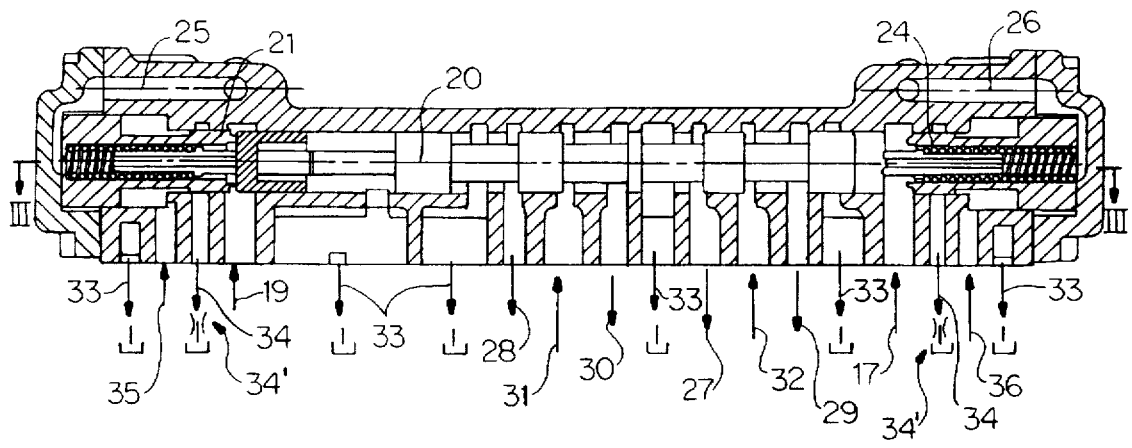
FIG. 2 is the structural design of the shift valve according to the invention in section along line II—II in FIG. 3 of the first embodiment.
Figure 3:
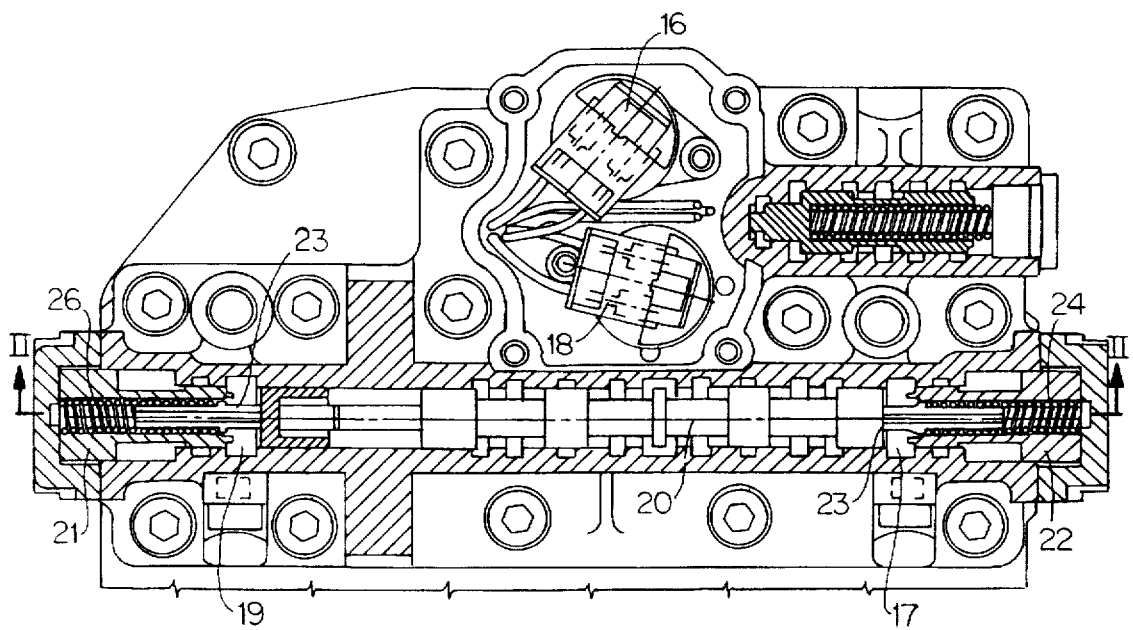
FIG. 3 is a section through the shift valve along line III—III in FIG. 2.

The structural design of the shift valve 2, according to a first embodiment, can be clearly seen from FIGS. 2 and 3.

Also integrated in the valve housing are the magnetic valves 16 and 18. The pressure lines 17 and 19 each discharge behind a front face of a slide valve 20. The slide valve 20, with its leading edges which interact with the valve housing 1, is of a known design, said edges, depending on their positions relative to the valve housing, accordingly supply pressure to the clutches 3 to 6. Centering pistons 21 and 22 are fitted in the valve housing 1 on the sides of the pressure lines 17 and 19 remote from the slide valve 20. Each one of the centering pistons has one inner tappet 23 which is prestressed by a spring 24. Both tappets 23, respectively, act upon a front face of the slide valve 20 in a manner such that in case of ineffectiveness of both magnetic valves 16 and 18, that is, in case of a lack of pressure in the pressure lines 17 and 19, the slide valve 20 is centered to a neutral central position. When one magnetic valve 16 or 18 is actuated, the slide valve 20 is moved against the spring-loaded tappet 23 of the corresponding other side.

Said actuation practically constitutes the basic function, namely, by means of a corresponding actuation of the desired magnetic valve 16 or 18, and therewith a corresponding pressurization in the pressure line 17 or 19, a displacement of the slide valve 20 and therewith a corresponding shifting or actuation of one of the clutches 3 or 6. After the magnetic valve is disconnected, the slide valve 20 returns to its centered position.

However, by virtue of the centering pistons 21 and 22 another additional function is possible. In an emergency situation, a travel direction can be shifted if needed, specifically in a manner such that the centering pistons 21 and 22 concerned are pressurized on their outer side. Serving this purpose are corresponding pressure lines 25 and 26 which end behind the front faces of the centering pistons 21 and 22. If pressure is supplied in one of the two lines 25 or 26, then the corresponding centering piston 21 or 22 moves in a direction toward the slide valve 20 and adequately adjusts it to the desired shift position. It is obviously required for this that the correspondingly activated centering piston 21 or 22 be displaced by double the normal travel distance of the slide valve in order to change the slide valve 20, for example, from a neutral position to a shift position. In other words, during emergency operation the centering piston 21 or 22 must cover the same distance as the slide valve 20 from forward to reverse.

In FIG. 2, the slide valve 20 is shown in a forward position and in FIG. 3 in a neutral position.

As a rule, the centering pistons must be actuated via the pressure line 25 or 26 independently from the normal function. This can be accomplished, for example, by a mechanically actuated pressure valve.

As mentioned, the forward shift position is shown in FIG. 2 which means that the pressure line 17 is pressurized. The lateral outputs from the valve housing 1, in the area of the slide valve 20, are each outputs or pressure lines to the clutches 3 to 6. The clutches 3, 4, 5 and 6 are correspondingly connected with said outputs via the clutch pressure lines 27, 28, 29 and 30. In FIG. 2 this is shown by arrows.

A pressure medium line 31 discharges for the clutches 4 and 6 in the shift valve 2. In the position shown in FIG. 2, the pressure medium line 32 is provided for the clutches 3 and 5. In addition, venting lines 33 are provided from the shift valve 2.

Venting lines 34 behind both front faces of the slide valve 20 are additionally provided, which have a throttle point 34'. Said venting lines have the following task:

When the prime mover of the vehicle is disconnected and thus the system pressure drops, the centering pistons 21 and 22 are brought, as quickly as possible, to the neutral position for the slide valve 20. For this reason, a quick pressure reduction is required. For this purpose, the leading edges of the centering pistons 21, 22 are now designed so as to ensure, on one hand, a sealing of the system pressure in an operating position but on the other, to obtain, when moving the slide valve 20 to a neutral position already after a short travel, a communication with the venting line 34 whereby the system pressure can be quickly reduced. A throttle point 34' is provided in the venting line 34 in order that the pressure cannot immediately escape again, via said venting line, when starting or during build up of the system pressure.

Figure 4:
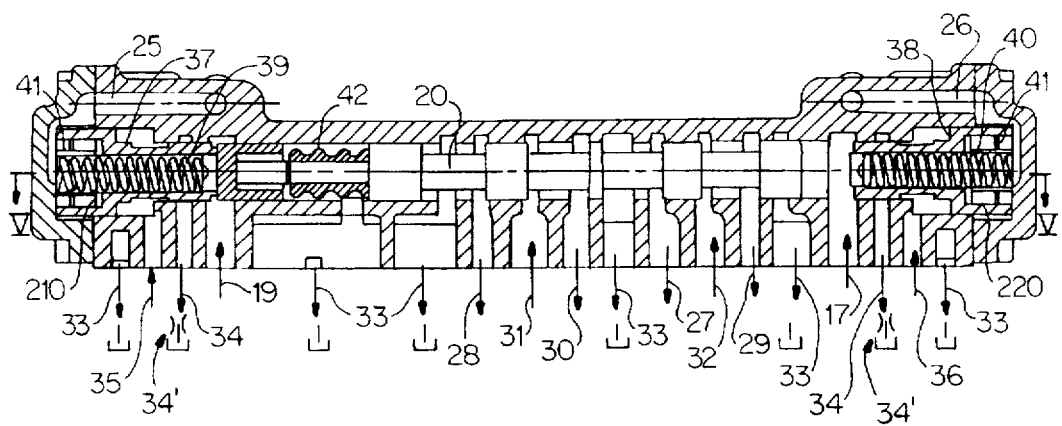
FIG. 4 is the structural design of the shift valve of the invention in section along line IV—IV in FIG. 5 of a second embodiment.
Figure 5:
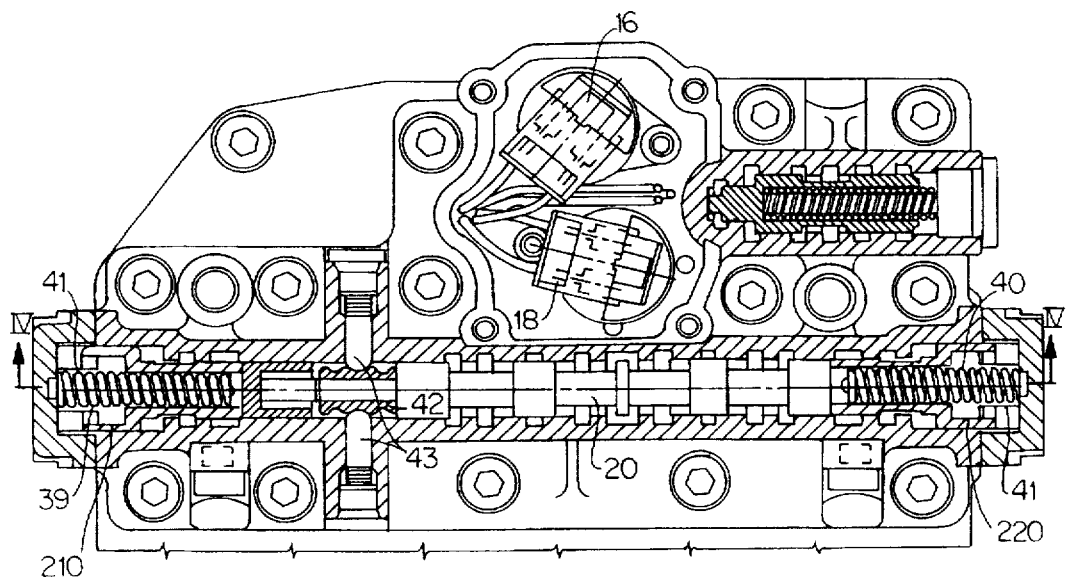
FIG. 5 is a section of the shift valve along line V—V in FIG. 4 of the second embodiment.

The embodiment in FIGS. 4 and 5 is basically of the same design for which reason the same numerals are used. The only essential difference is in the design of the centering pistons 210 and 220. The basic function for an emergency operation here is the same and so is the layout of the leading edges and control ducts in the shift valve 2.

However, in this embodiment the tappets for the centering pistons are not needed. As soon as the prime mover is engaged, the system pressure reaches a level of 18 bar, for example, in both connections 35 and 36 and thus on the pressure surfaces 37 and 38 of the centering pistons 210 and 220 whereby the latter are spread against the compression of the springs 39 and 40. The springs 39 and 40 are each secured by a steel cap 41 which is positioned in the respective centering piston 210 and 220 in any desired manner, such as by a snap ring. If both centering pistons 210 and 220 are pushed back to normal operation as result of the system pressure, the slide valve 20 is freely displaceable. The desired displacement takes place in the same manner as in the other embodiment by the correspondingly activated magnetic valve 16 or 18.

Unlike in the first embodiment, in this case a detent, such as a stop member 42, is required, which is connected with the slide valve 20. The stop member 42 is provided with 3 detents for forward travel, neutral position and for reverse travel and in them engage the spring-loaded pins 43. The slide valve 20 is kept in the position engaged by the stop member. But the detent only comes into effect when the magnetic valves 16, 18 or the whole electronic system fail if, as consequence thereof, hydraulic forces no longer act upon the slide valve 20. The detent in FIG. 5 is shown in the neutral position.

Said detent is provided as a safety function. In the case of failure of a magnetic valve or of the electronic system, the engaged travel direction will be maintained. But when the travel direction nevertheless has to be changed in an emergency, the driver has also the same possibility as with the embodiment of FIGS. 2 and 3. In this case, pressure is supplied to the rear side of the desired centering pinion, via the line 25 and 26, whereby the slide valve 20 can be moved to the desired travel position.

In the absence of system pressure, that is for example when the prime mover is disconnected, both centering pistons 210 and 220 bring the slide valve 20 back to the neutral position.

An additional advantageous design of the shift valve 2 is provided for the embodiment of FIGS. 4 and 5. As can be seen from the flow diagram in FIG. 1, an external directional valve 44 is provided which can be manually or electrically. The directional valve 44 constitutes an added safety circuit. It is loaded with system pressure and when operated, pressure is supplied via the pressure lines 25, 26 to both centering pistons 210 and 220 on the outer side or spring side whereby the slide valve 20 is brought to its neutral position. The directional valve 44 is "externally" designed because it can be fitted any place outside the shift valve 2. For its operation, it is only needed that the prime mover is still running and thus system pressure exists. In this manner, an active neutral engagement of the slide valve 20 is obtained as added protection. This means that the possibility thus exists of obtaining a neutral position from any position.

If the directional valve 44 is designed as a 4/3 directional valve or if two magnetic valves are provided for this, a specific travel direction position together with a neutral position can be additionally selected, in the presence of system pressure, that is, while the engine is running. In this case, pressure is applied only to one outer side or spring side of one of the two centering pistons while the other centering piston is ventilated on the outer side.

In addition to the directional valve 44 or instead of it, a neutral valve 45 can be provided which is located in the pressure line 46 of the shift valve 2. System pressure prevails in the pressure line 46. If the neutral valve 45 is actuated, the system pressure is shut off and the pressure line 46 is thus ventilated. This means that by thus shutting off the system pressure, the shift valve 2 can be switched to the neutral central position. The neutral valve 45 can be actuated manually or electrically.

| Reference numerals | | | |
|---|---|---|---|
| 1 | valve housing | 23 | tappet |
| 2 | shift valve | 24 | spring |
| 3 | forward clutch | 25 | pressure line |
| 4 | forward clutch | 26 | pressure line |
| 5 | reverse clutch | 27 | clutch pressure line |
| 6 | reverse clutch | 28 | clutch pressure line |
| 7 | pressure line | 29 | clutch pressure line |
| 8 | system pressure valve | 30 | clutch pressure line |
| 9 | lubrication line | 31 | pressure medium line |
| 10 | pressure control valve | 32 | pressure medium line |
| 11 | retaining valve | 33 | venting line |
| 12 | gearshift clutch | 34 | venting line |
| 13 | gearshift clutch | 35 | connection |
| 14 | shift valve | 36 | connection |
| 15 | shift valve | 37 | pressure surface |
| 16 | magnetic valve | 38 | pressure surface |
| 17 | pressure line | 39 | spring |
| 18 | magnetic valve | 40 | spring |
| 19 | pressure line | 41 | steel cap |
| 20 | slide valve | 42 | detent member |
| 21 | centering piston | 43 | pin |
| 210 | centering piston | 44 | directional valve |
| 22 | centering piston | 45 | neutral valve |
| 220 | centering piston | 46 | pressure line |

We claim:

1. A powershaft transmission with shift valve device for switching a travel direction of a vehicle, said shift valve device comprises:

a slide valve, within a valve housing, that can be adjusted between one of a forward, a reverse and a neutral gear position, said slide valve (20) is adjusted between said gear positions by means of an electro-hydraulic device; and at least two centering pistons (21, 22 and 210, 220) within said valve housing (1) which, during normal operation, are moved to an actuated position such that the normal operation of the electromagnetic device is bypassed so as to adjust said slide valve (20), to a desired one of said gear positions.

2. A shift valve according to claim 1, wherein said electro-hydraulic device comprises magnetic valves (16, 18) connected by pressure lines (17, 19) for adjusting said slide valve (20).

3. A shift valve according to claim 1, wherein one of said at least two centering pistons is positioned on a front side of said slide valve (20), and said shift valve further comprising:

a prestressed centering spring (39, 40), for each of said at least two centering pistons, having a prestress force such that as said at least two centering pistons (210, 220) bias said slide valve (20) into an appropriate gear position, via said centering springs, said prestress force of said centering springs (39, 40) is sufficiently strong enough to overcome any resistance exerted by a detent on said slide valve (20).

4. A shift valve according to claim 1, wherein each of said at least two centering pistons are positioned so that, during said normal operation, a sufficient system pressure may be sustained and, in the absence of said pressure, a communication is established between a venting line (34) and two connection points (35, 36) positioned behind said slide valve (20).

5. A shift valve according to claim 4, wherein said venting line (34) comprises at least one throttle point for preventing said pressure from escaping during start up and build up of said pressure.

6. A shift valve according to claim 1, wherein said at least two centering pistons are actuated by hydraulically.

7. A shift valve according to claim 1, further comprising at least one external directional valve loaded with pressure for adjusting said slide valve (20) into said neutral position as a safety measure wherein said slide valve is adjusted by supplying said at least two centering pistons with said pressure loaded onto said directional valve on an outer side of each of said at least two centering pistons.

8. A shift valve according to claim 7, wherein said pressure loaded onto said directional valve is used to adjust said slide valve into said neutral position by supplying said pressure to said outer side of one of said at least two centering pistons and by venting the other of said at least two centering pistons.

9. A shift valve according to claim 8, wherein said directional valve is a 4/3 directional valve.

10. A shift valve according to claim 7, wherein said directional valve is one of manually and electrically operated.

11. A shift valve according to claim 1, further comprising an external neutral valve (45), in at least one pressure line (46) leading to said slide valve, for interrupting the supply of system pressure on an inner side of said at least two centering pistons.

12. A shift valve according to claim 11, wherein said external neutral valve is one of manually and electrically operated.

* * * * *